United States Patent [19]

Martin et al.

[11] 4,102,014
[45] Jul. 25, 1978

[54] MODIFICATION ASSEMBLY TO A MACHINE FOR PROCESSING THE BACKS OF POULTRY

[75] Inventors: Eugene G. Martin; Dale M. Risser, both of Ephrata, Pa.

[73] Assignee: Victor F. Weaver, Inc., New Holland, Pa.

[21] Appl. No.: 784,655

[22] Filed: Apr. 4, 1977

[51] Int. Cl.² .............................................. A22C 21/00
[52] U.S. Cl. ............................................. 17/11; 17/45
[58] Field of Search ........................................ 17/11, 45

[56] References Cited

U.S. PATENT DOCUMENTS

| | | | |
|---|---|---|---|
| 3,323,164 | 6/1967 | Bonuchi et al. | 17/11 |
| 3,731,344 | 5/1973 | Phares et al. | 17/11 |
| 3,787,926 | 1/1974 | Schacht | 17/11 |
| 3,837,045 | 9/1974 | Blacker | 17/11 |
| 3,930,282 | 1/1976 | Martin et al. | 17/11 |
| 3,930,283 | 1/1976 | Martin | 17/11 |
| 4,016,624 | 4/1977 | Martin et al. | 17/11 |

*Primary Examiner*—Louis G. Mancene
*Assistant Examiner*—Paul J. Hirsch
*Attorney, Agent, or Firm*—Samuel M. Learned, Jr.

[57] ABSTRACT

A poultry back processing machine improvement modification assembly comprised of the combined mechanical assembly of a configured water slide infeed trough into which poultry back members for mechanically automatic interior surface fatty tissue and kidney removal processing are manually positioned in a sequential series for safe and efficient delivery thereof to the processing machine conveyor, a laterally spaced set of longitudinally disposed angularly downward positioned bar members to guide the respective depending flank sections of the poultry back members into a distended flank configuration for improved mechanical access to the interior back member surfaces, a laterally spaced set of laterally outward angled longitudinally extending opposingly outward rotating interior poultry back member fat removal and flank section spreading screens, longitudinally followed by a set of laterally spaced stationary blades positioned to sever the respective kidney retaining membranes interior of each back member for immediately subsequent kidney removal by a set of laterally spaced and aligned vacuum tubes, thereby delivering for further external surface processing and lean meat removal poultry back members having the interior surface fatty tissue and kidneys removed therefrom. A modified version of the machine is also shown wherein the water slide infeed trough is replaced with a double-belted infeed conveyor assembly.

45 Claims, 11 Drawing Figures

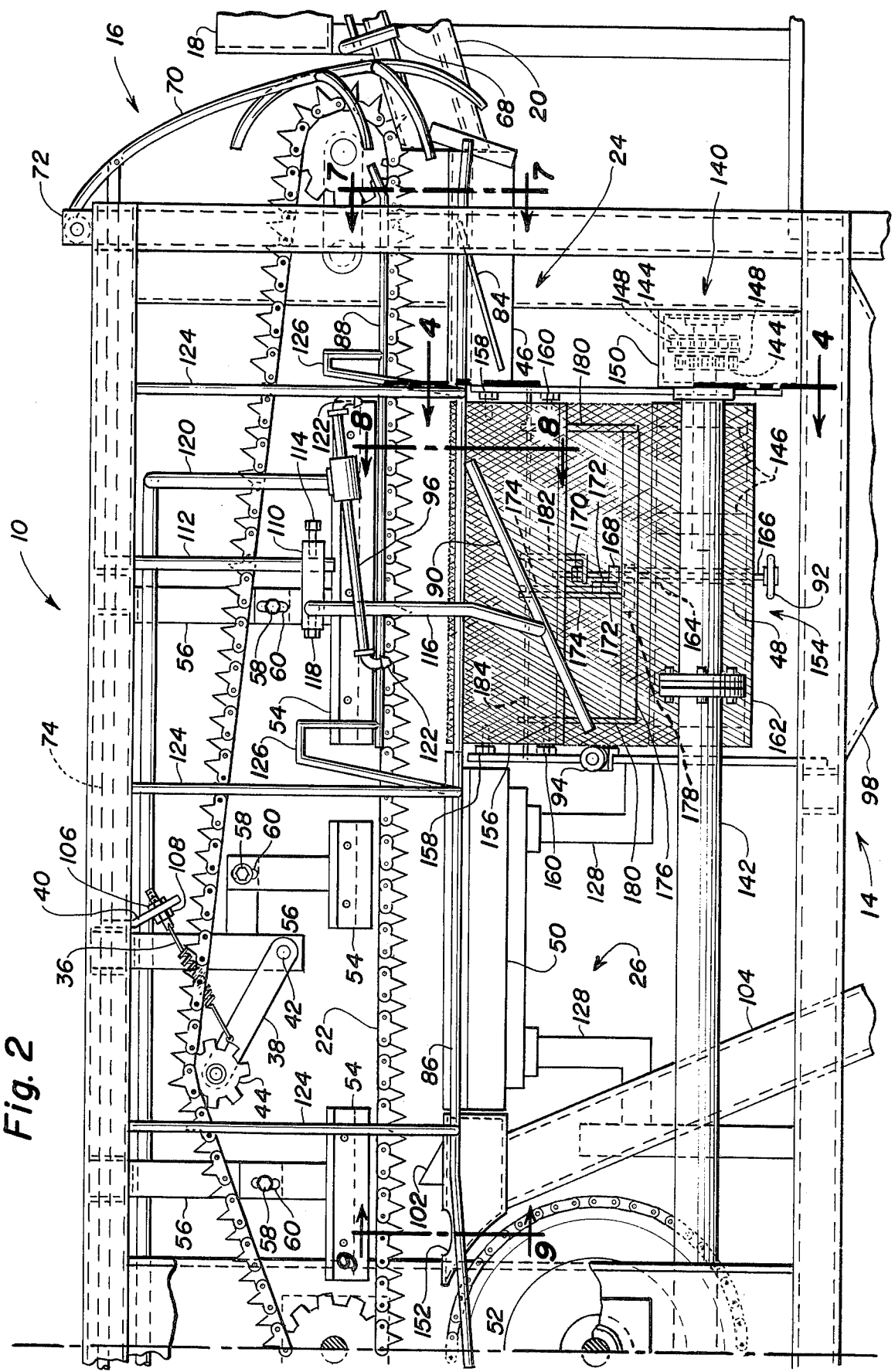

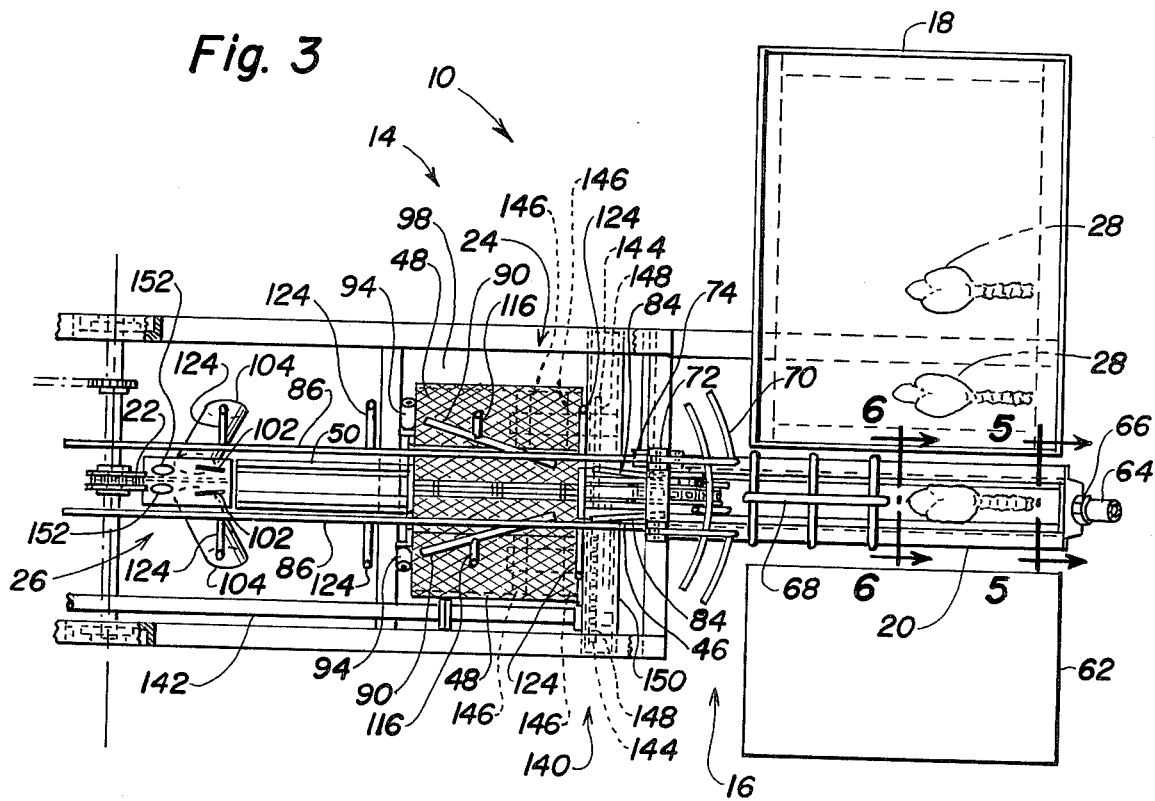
Fig. 3
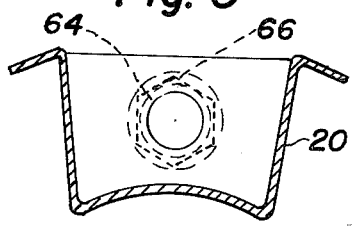
Fig. 5
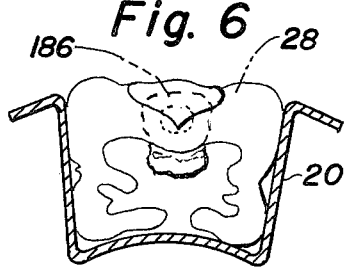
Fig. 6
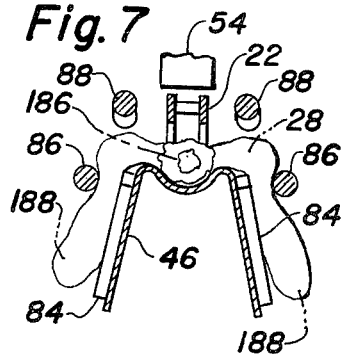
Fig. 7
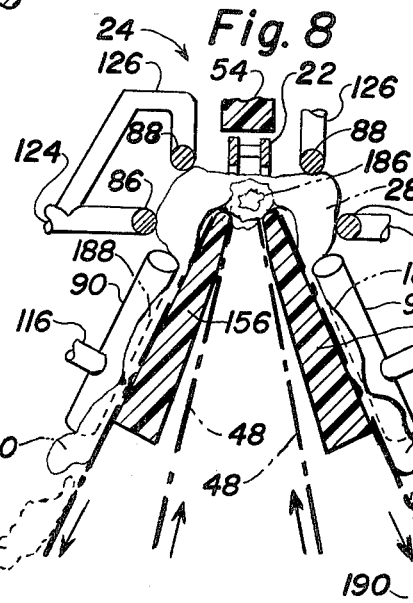
Fig. 8
Fig. 9

MODIFICATION ASSEMBLY TO A MACHINE FOR PROCESSING THE BACKS OF POULTRY

BACKGROUND OF THE INVENTION

It is to be understood that the present invention discloses an improvement modification assembly to a machine for processing the backs of various fowl, which would include but not necessarily be limited to old and young chickens, at least small turkeys, ducks, and guineas, but for simplicity the same are hereinafter defined by the generic term "poultry".

Additionally, specific reference is herein made to the instant applicants previous inventive disclosure as taught in U.S. Pat. No. 3,930,282 dated Jan. 6, 1976, to Martin et al, wherein an exemplary machine for processing the backs of poultry, to which the instant improvement modification disclosure is adapted to be operationally installed, is illustrated and described in detail.

In the mechanically automated processing of poultry back members to recover the rather scant amount of lean meat contained thereon, which meat, if cleanly removed absent an inclusion of organ or fat tissue or contaminating bone fiber, may be employed as an ingredient in combination with other more expensive meats in the preparation of all meat frankfurters and other such process meat products. However, in view of the current and evolving strictly enforced government regulations requiring that only lean meat from poultry backs may be used in all meat process products, and since highly reliable mechanically automated removal of both the kidneys and fatty tissue from the interior surfaces of poultry backs has not heretofore been available, and further since completely manual or simple mechanically augmented manual interior fatty tissue and kidney removal means are neither operationally or economically competitive with mechanically automated removal means, practically speaking all poultry back meat currently removed by mechanically automated means as a consequence of regulation is of necessity relegated to use in less expensive foodstuff products such as soups and the like.

The subject of the instant invention comprises a poultry back processing machine improvement modification which is designed to conveyably position and spread the respective depending flank sections of a series of poultry back members introduced to the machine, automatically remove the fatty tissue from the interior surfaces thereof, and further supportably convey the poultry back members in an angularly depending flank-extended configuration for automatic kidney retaining membrane severing and automatic kidney removal by vacuum means, thereby delivering poultry back members for further external surface processing and meat removal wherein said members have the interior surface fatty tissue and kidneys removed therefrom.

The instant invention is distinguishable from said earlier invention and prior poultry back processing means in one or more ways in that the present invention has utility features and new and useful advantages, applications, and improvements in the art of processing mechanism to accomplish removal of fatty tissue and kidneys from poultry back members not heretofore disclosed, as set forth hereinafter.

SUMMARY OF THE INVENTION

It is the principal object of the present invention to provide a poultry back processing machine improvement modification assembly which automatically accomplishes interior surface fatty tissue and kidney removal from poultry back members fed therethrough, prior to subsequently accomplished external surface fatty skin and tail removal from said members, so that the meat ultimately recovered therefrom may be utilized in the preparation of process foodstuffs which require as component ingredients thereof all lean meat and no organ or fat tissue.

It is another object of the present invention to provide a configured water slide infeed trough into which poultry back members for interior fatty tissue and kidney removal processing are manually positioned for safe infeed delivery thereof to said improvement modification, at a feeding speed which does not limit the processing capacity of said machine.

It is a further object of the present invention to provide mechanical means whereby the respective depending flank sections of poultry back members are respectively positioned into angularly distended configurations for improved mechanical access to the interior back member surfaces in order to facilitate accomplishing automatic fatty tissue and kidney removal therefrom.

Still another object of the present invention is to provide automatically operational mechanical means which eliminate the certain manual steps in fatty tissue and kidney removal processing of poultry back members as generally heretofore employed, thereby resulting in a significant reduction in processing time and a significant increase in processing output not previously realized during manual or simple mechanically augmented manual poultry back processing operations.

It is still another object of the present invention to provide an improvement modification to a machine for processing the backs of poultry which is mechanically adapted to automatically accommodate poultry back members of different physical size and configuration.

It is also an additional object of the present invention to provide an improvement modification to a machine for processing the backs of poultry which is safe and simple in operation, requires a minimum of make-ready time, which may be set and operationally tended by an average employee not possessed of special skills or training.

BRIEF DESCRIPTION OF THE DRAWINGS

FIG. 2 is a enlarged fragmentary side elevation of the instant invention as shown in FIG. 1.

FIG. 3 is a top sectional view of the improvement modification shown in FIG. 1 as seen along the line 3 — 3 thereof.

FIG. 5 is an enlarged end sectional elevation of the poultry back member feeding trough shown in FIG. 3 as seen along the line 5 — 5 thereof.

FIG. 6 is an enlarged end sectional elevation of the feeding trough shown in FIG. 3 as seen along the line 6 — 6 thereof, showing also an exemplary poultry back member disposed therein.

FIG. 7 is an enlarged end sectional elevation of the flank spreading angle bar assembly of the instant invention shown in FIG. 2 as seen along the line 7 — 7 thereof, showing also an exemplary poultry back member disposed thereon.

FIG. 8 is a fragmentary enlarged end sectional elevation of the opposingly rotating interior poultry back member fat removal and flank spreading screen assembly shown in FIG. 2 as seen along the line 8 — 8 thereof, showing also an exemplary poultry back member disposed thereon.

FIG. 9 is a fragmentary enlarged end sectional elevation of the kidney retaining membrane severing and kidney removal means of the instant invention shown in FIG. 2 as seen along the line 9 — 9 thereof, showing also an exemplary poultry back member disposed thereon.

DETAILED DESCRIPTION OF THE INVENTION

Figures 1, 4:
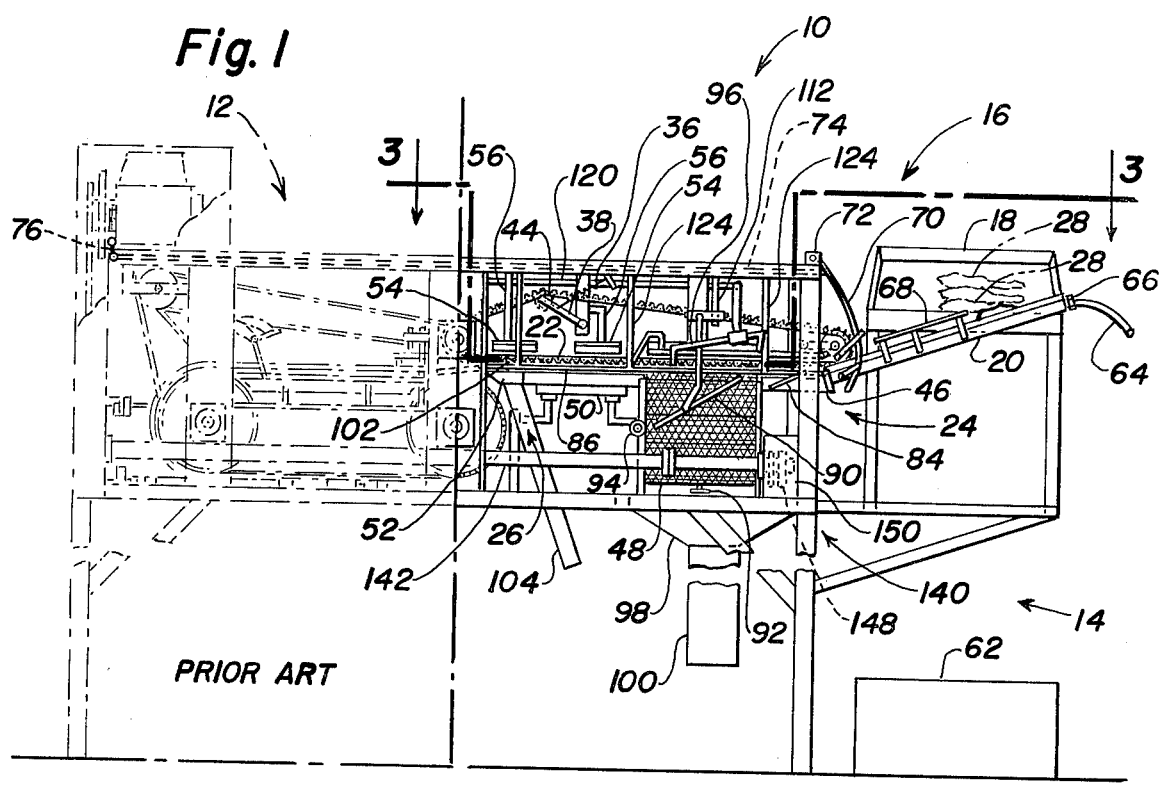
FIG. 1 is a side elevation of the improvement modification assembly comprising the instant invention, the same being shown operationally installed upon an exemplary prior art machine for processing the backs of poultry.
FIG. 4 is an enlarged end elevation view of the opposingly rotating interior poultry back member fat removal and flank spreading screen assembly of the instant invention shown in FIG. 2 as seen along the line 4 — 4 thereof.

Referring to FIG. 1, the present invention is shown which comprises in combination an improvement modification assembly 10 operationally installed within a prior art machine 12 for processing the backs of poultry, said improvement modification assembly having a rigid supporting frame structure 14 comprised of horizontally and vertically disposed support members, an infeed safety guard assembly 16, a poultry back member staging tray 18 from which unprocessed poultry back members are sequentially operator positioned in a tail-leading relation relative one to the other into a configured water slide infeed trough 20 for delivery to engagement by the impaling conveyor chain 22, and thereafter being conveyably transported first through a poultry back member flank distending and interior fat removal station 24 and second through a kidney retaining membrane severing and kidney removal station 26, afterwhich said poultry back members are sequentially transported to the prior art section of said machine 12 for external fatty tissue removal processing operations.

Referring again to FIG. 1 to describe in greater detail the component parts of this invention as well as explain the operation thereof, wherein is also shown exemplary poultry back members 28 for interior fatty tissue and kidney removal processing. Prior to use application, said improvement modification assembly 10 is first set to accommodate the average longitudinally central back thickness of the particular run of poultry back members to be processed, and since the backs to be processed in such a run will have come from the same species of poultry, of generally the same weight, all poultry backs in a particular run will be of generally the same size and thickness. Accordingly, the two-stage set to be made for accommodating poultry back member thickness in a particular run is accomplished by first adjusting the impaling conveyor tension by means of the threadably adjustable tension spring 36 which connects the idler sprocket pivot arm 38 to the tension spring adjustment bracket 40, and by means of either threadably extending or retracting said spring 36 arcuately depress or elevate the idler sprocket pivot arm 38 about pivot pin 42 and thereby either arcuately lower or raise the idler sprocket 44 rotatably assembled to the upper end of said pivot arm 38 which in turn either decreases or increases the tension on said impaling conveyor chain 22, and consequently provides either greater or less deflectable clearance for poultry back thickness between said chain 22 and the aligned infeed back member support rail 46, rotating screens 48, back member transport support rail 50, and the severing blade and vacuum tube support rail 52 of said improvement modification assembly 10. Secondly, the respective improvement modification impaling chain back-up rails 54 are vertically adjusted upon their respective mounting posts 56 by means of compression bolts 58 and vertical slots 60 (said bolts and slots not being shown in FIG. 1, but illustrated in detail in FIG. 2) to an elevation sufficient to accommodate the impaling conveyor chain deflection during processing transport of a particular run of poultry back members of an average longitudinally central back thickness through said improvement modification assembly 10. Upon accomplishment of the above-described improvement modification assembly sets the operator may then commence with poultry back processing operations.

During processing operation poultry back members are continually delivered to and placed in the poultry back member staging tray 18 by either other personnel or mechanical means. The operator stands upon a work platform 62 facing the poultry back member staging tray 18 which as shown is mounted on an incline towards the operator thereby facilitating delivery of said poultry back members for manual positioning thereof into the configured water slide infeed trough 20 by said operator. The configured water slide infeed trough 20 is supplied with water through hose 64 which is assembled to the upward terminal end of said trough 20 by hose connector 66, and just enough water is admitted to said trough 20 whereby there is provided a lubricating water-film which thereby facilitates slidable delivery of said poultry back members to the impaling conveyor chain infeed of said improvement modification assembly. As previously stated, the unprocessed poultry back members contained in said staging tray 18 are removed therefrom by the operator and sequentially positioned in a tail-leading relation relative one to the other into said configured water slide infeed trough 20 for delivery to engagement by the impaling conveyor chain 22. It will be noted that the infeed safety guard assembly 16, which provides operator protection during poultry back member infeed positioning and delivery, is comprised of both a trough guard 68 consisting of a spaced plurality of longitudinally interconnected and inverted U-shaped members which serves to limit the extent of proximity of the operator's hands to the impaling conveyor chain 22, and secondly, a main drive motor shut-off safety guard 70 which is pivotally assembled to the frame structure 14 by mounting bracket 72 and being assembled therethrough to connecting rod 74 which serves to throw a main drive motor shut-off switch 76 in the event of either a jam at the infeed station or operator activation by arcuately displacing said safety guard 70 pivotally toward the frame structure 14 within said mounting bracket 72.

The respective poultry back members are automatically engaged longitudinally along the central back thickness thereof at the infeed station by the impaling conveyor chain 22 and thereby transferred from said configured water slide infeed trough to the infeed back member support rail 46 upon which, statically assembled to the respective lateral sides thereof, are the flank spreading angle bars 84 which serve to spread the respective depending flank sections of said poultry back members for enhanced mechanical access to the interior back member surfaces prior to being conveyably transported to the rotating screens 48 for interior surface fatty tissue removal. It should be noted that the interior back and flank section surfaces of said back members are held in close communication with the respective functional components of said improvement modification assembly 10 by means of the respective laterally spaced longitudinally disposed flank section side guide rails 86, which provide guide and hold-down functions as to the depending flank sections of said back members during conveyable transport thereof from the infeed to the delivery end of said improvement modification assembly 10. Additionally, a set of upwardly positioned laterally spaced longitudinally disposed back member hold down rails 88 are provided from the infeed through the flank distending and interior fat removal station 24 of said improvement modification assembly 30 and serve primarily to restrain the vertical rise of back members during interior surface fatty tissue removal by said rotating screens 48 as said back members are conveyably transported thereover.

As the back members conveyably engage the rotating screens 48 the respective laterally spaced defining flank sections thereof are also engaged and held against said rotating screens by a set of angled flank section hold down rods 90 which are respectively both vertically and arcuately adjustable with respect to said rotating screens by means more clearly illustrated in FIG. 2, to be discussed in detail hereinafter. It should also be noted at this point that the tension on said rotating screens 48 is either increased or decreased by rotating or counter-rotating wheel 92 which in turn adjusts screen tension by means more clearly illustrated in FIG. 4, also to be discussed in detail hereinafter. However, the vertical alignment of each rotating screen 48 is respectively maintained by a screen guide roller 94 as shown in FIG. 1, and in operation each of said rotating screens is respectively lubricated and flushed with a water spray furnished from a spray wand 96 as also shown in FIG. 1. The fatty tissue removed by said rotating screens, and the water spray flushings therefrom, are discharged to a collection bin 98 and continuously therefrom through chute 100 to a suitable container, not shown.

After continuously conveyable processing through the flank distending and interior flat removal station 24 as above-described, the poultry back members are further conveyed across the back member transport support rail 50 to the kidney retaining membrane severing and kidney removal station 26 where completion of the interior processing of said poultry back members is accomplished. First, as said poultry back members are conveyed forward the kidney retaining membranes are respectively engaged by a set of triangular shaped angularly positioned stationary blade members 102 which sever the kidney retaining membranes on either side of the uppermost interior section of the back members as the same are slidably conveyed over and past said stationary blade members 102. Immediately following such severing operation a pair of laterally positioned vacuum tubes 104 automatically remove the exposed kidney organs from the poultry back members by vacuum means as said back members are conveyed thereacross, just prior to the delivery thereof from the improvement modification assembly 10 comprising the present invention to the prior art machine section 12 for accomplishment of external back member processing operations.

All of the poultry back member interior surface processing operations as above-described generally, from the infeeding of an exemplary poultry back member to kidney removal by vacuum means, are as respectively illustrated in detail in FIG. 6 through FIG. 9 inclusive, each of which Figures will be described and discussed in detail hereinafter.

The improvement modification assembly as disclosed in FIG. 1, as well as the other views heretofore mentioned, may be constructed of metal, or plastic, or any other suitable materials or a combination thereof.

The view shown in FIG. 2 is an enlarged fragmentary side elevation of the functional processing stations of the instant invention as illustrated in FIG. 1 and heretofore described, but, however, showing greater detail thereof. In particular, the setting of tension on the impaling conveyor chain 22 by means of the threadably adjustable tension spring 36 is shown as being established by threadable positioning of the set nut 106 which is compressively engaged by tension spring force against the upper side of the tension spring adjustment bracket 40 and then secured in set position by threadably compressive engagement of the lock nut 108 against the lower side of said tension spring adjustment bracket 40.

Additionally shown in greater detail in FIG. 2 is the mounting and adjustment means for one of the respective angled flank section hold down rods 90, the same as previously stated being both vertically and arcuately adjustable with respect to the rotating screen 48. An adjustable mounting block 110, being provided near the respectively opposite longitudinal ends thereof with perpendicularly oriented centrally located circular openings therethrough which in turn are each provided with a communicating perpendicularly positioned threaded opening respectively adapted to receive a set bolt, is slidably assembled at one end thereof to a vertically depending mounting rod 112 and adjustably secured thereby by means of the vertical adjustment set bolt 114, and at the other end thereof slidably receiving the horizontal leg of the geometrically configured hold down rod connecting arm 116 which is adjustably secured to said mounting block 110 by set bolt 118, whereby vertical and arcuate adjustments as well as limited lateral adjustment of the respective angled flank section hold down rods 90, to insure a directed close communication between the respective interior flank section surfaces and said rotating screens 48 during processing operation interior fatty tissue removal from poultry back members, is accomplished.

It will be further noted, as shown in FIG. 2, that the spray wand 96 is supplied with water, from a suitable source, through connecting pipe 120, said water being directed and distributed upon the rotating screen 48 through spray nozzles 122. Also shown in greater detail in FIG. 2 are the mounting bracket means for the flank section side guide rails 86 and the back member hold down rails 88, respectively being L-brackets 124 and inverted U-brackets 128. Certain of the details of the rotating screen tensioning adjustment means, as shown in FIG. 2, will be discussed in detail hereinafter during the description of FIG. 4.

Referring now to FIG. 3, wherein a top plan sectional view of the improvement modification assembly as seen along the line 3 — 3 of FIG. 1 is illustrated, therein showing a lateral as well as longitudinal relationship configuration of the respective processing station components thereof. As more clearly shown in FIG. 3, the rotating screens 48 are driven in opposing rotary motion through the rotation screen drive train 140 off drive shaft 142 powered by the machine 12 motor, said drive train 140 being comprised of respective belt pulleys 144 and rotating screen friction drive drums 146 communicably translating rotary motion through belts 148, all of which is enclosed within protective cover 150. Also more clearly shown in FIG. 3 are the kidney removal ports 152 of the kidney removal station 26, through which ports the kidneys are removed by vacuum means after severing of the respective kidney retaining membrane tissues by triangular shaped angularly positioned stationary blade members 102.

The view shown in FIG. 4 is an enlarged end sectional elevation of the rotating screen tensioning adjustment means 154 of the flank distending and interior fat removal station 24 of the present invention, whereby the tension on said rotating screens 48 is adjusted and maintained in a taut condition during interior fatty tissue removal processing operations. The respective rotating screens 48 are joined in an endless longitudinally disposed loop about a pair of longitudinally elongated angled positioning shoes 156, respectively affixed in a spaced stationary laterally depending outward angled configuration relative one of the other upon upper mounting bars 158 and lower mounting bars 160, and also about opposingly rotating screen friction drive cylinders 162 respectively having the outward external circumferences thereof positioned in tangentially longitudinal alignment with the outward configuration angle of said positioning shoes 156. Centrally positioned of the longitudinal dimension of said rotating screens 48 and the support and drive assembly therefor above-described is a rotating screen tensioning adjustment means mounting column 164, said column being adapted to receive centrally interior thereof a rotating screen tensioning adjustment shaft 166 threadably engaged through a vertically displaceable block 168 slidably assembled to said column 164, there being threadably assembled to the upward end of said shaft 166 a stationary nut screwing elevation and depression assembly 170 and affixed to the lower end of said shaft 166 the wheel 92. Upon rotation or counterrotation of said wheel 92 said vertically displaceable block 168, having pivotally connected thereto variably angled pusher arms 172 in turn pivotally assembled to pivotally angled rotating screen tension roller adjustment arms 174, raises or lowers thereby increasing or decreasing the pusher arm angle therebetween, consequently urging the respective pivotally assembled longitudinally disposed rotating screen tensioning rollers 176 outward against or inward from said rotating screens 148 whereby the tension thereon is either adjustably increased or decreased. The rotating screen tensioning roller curved pursher shoes 178, affixed to said pivotally angled rotating screen tension roller adjustment arms 174, are the means whereby rotating screen tensioning adjustment is translated to the rotating screen tensioning rollers 176 which in turn are rotatably assembled to pivotally adjustable rotating screen tensioning roller mounting arms 180. The stationary nut screwing elevation and depression assembly 170 is affixed to angle bracket 182, and the pivotally angled rotating screen tension roller adjustment arms 174 and the rotating screen tensioning roller mounting arms 180 are pivotally assembled at the respective upward ends thereof to the screen tensioning support rod 184. As previously pointed out, the screen guide rollers 94 maintain the respective rotating screens 48 in longitudinal alignment during processing operations.

Referring now to FIG. 5 through FIG. 9 inclusive, which illustrate for purposes of detailed description the specific means whereby the respective operational stations of the improvement modification assembly comprising the present invention accomplishes the interior poultry back member processing of fatty tissue and kidney removal.

The view shown in FIG. 5 is an enlarged end sectional elevation of the configured water slide infeed through 20 as it appears prior to operator positioning of exemplary poultry back members 28 therein for delivery to the infeed section of the improvement modification assembly comprising the present invention. The view shown in FIG. 6 is similar to that as illustrated in FIG. 5, but, however, further illustrating the positioning of an exemplary poultry back member 28 within the configured water slide infeed trough 20, with the backbone 186 of said exemplary poultry back member positioned upward and centrally longitudinal of said configured water slide infeed trough and the respective flank sections 188 thereof downwardly disposed in a laterally spaced relationship one with respect to the other as shown in FIG. 6.

The view shown in FIG. 7 illustrates the configuration of an exemplary poultry back member 28 after the same is delivered from the configured water slide infeed trough 20 and engaged longitudinally along the central backbone portion thereby by the impaling conveyor chain 22 and conveyably delivered through the infeed station upon the infeed back member support rail 46. It is to be particularly pointed out, however, it is during slidably conveyable transport of exemplary poultry back members 28 through the instant station of discussion that the interior surfaces of the depending flank sections 188 thereof are engaged by the flank spreading angle bars 84 and distended into a spread configuration as shown in FIG. 7 for enhanced mechanical access to the interior poultry back member surfaces during the subsequent processing operations of interior fatty tissue and kidney removal.

Now considering FIG. 8, wherein is illustrated the configuration of an exemplary poultry back member 28 during processing operation transport through the flank distending and interior fat removal station 24, showing the retainable hold down of said back member, the slidable close communication engagement of the respective flank sections 188 thereof between the angled flank section hold down rods 90 and the opening rotating screens 48, and the removal of interior back member fatty tissue 190 by said rotating screens 48.

Referring next to the view shown in FIG. 9, wherein is illustrated the configuration of an exemplary poultry back member 28 during processing operation transport through the kidney retaining membrane severing and kidney removal station 26, whereby the respective kidney retaining membrane tissues are automatically severed by the triangular shaped angularly positioned stationary blade members 102 during conveyable transport through said station 26, and then the respective kidneys 192 are likewise automatically withdrawn through the kidney removal ports 152 by vacuum means communicating through vacuum tubes 104. Again, it is to be particularly pointed out, that the distended configuration of the exemplary back member 28 is accomplished in combination with the positioning of the backbone 186 and respective flank sections 188 thereof upon the configured profile of the severing blade and vacuum tube support rail 52, whereby enhanced mechanical access is provided to the interior back member surfaces, comprises a major feature of the improvement modification assembly of the instant invention.

Figure 10:
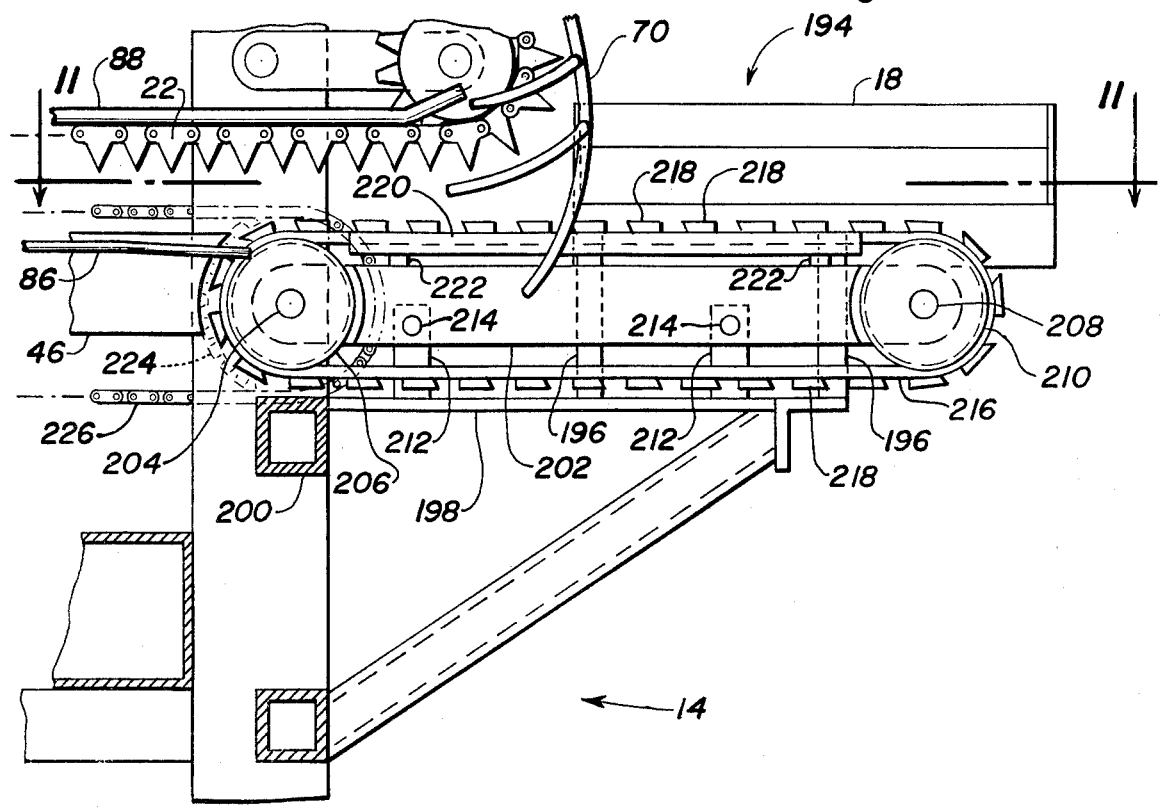
FIG. 10 is a fragmentary enlarged side elevation of the improvement modification assembly comprising the instant invention wherein the water slide infeed trough has been replaced with a double-belted infeed conveyor assembly.
Figure 11:
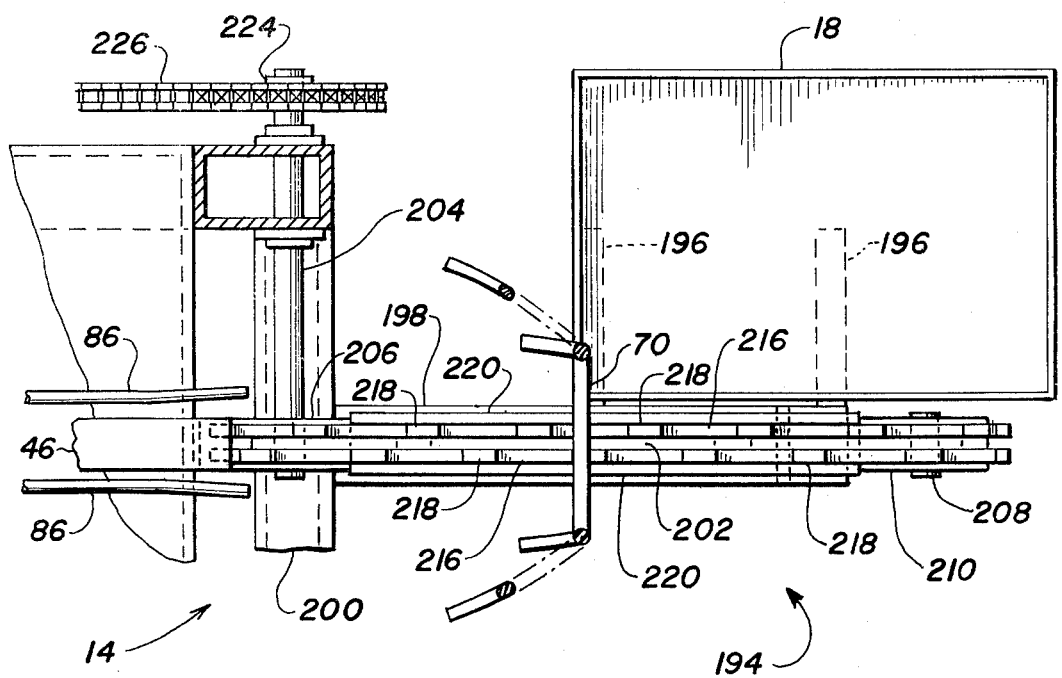
FIG. 11 is a top sectional view of the double-belted infeed conveyor assembly shown in FIG. 10 as seen along the line 11 — 11 thereof.

A modified poultry back member infeed means, comprised of a double-belted infeed conveyor assembly 194 as respectively illustrated in FIG. 10 and FIG. 11, may be provided in place of the water slide infeed trough, and, depending upon the handling characteristics of the particular poultry back member product being processed the double-belted infeed conveyor in some instances proves to be a more satisfactory mechanical means by which to accomplish sequential delivery of poultry back members to the operational processing stations per se of said improvement modification assembly comprising the instant invention as previously described.

As shown, said infeed conveyor assembly 194 occupies the same relative machine location position as would the water slide infeed trough except being mounted in a horizontally longitudinal alignment configuration with respect to the infeed back member support rail 46 instead of at an inclined angle relative thereof. Again, in order to facilitate delivery of poultry back members for processing of the operator station the poultry back member staging tray 18 remains assembled at an inclined angle relative thereto, but in the current instance being secured to the poultry back member staging tray support bars 196 which are in turn affixed to the base support bar 198 assembled to the base support bar cross member 200 which is supported by the frame structure 14 of the instant invention. The impaling conveyor chain 22 remains in the same position as previously described relative to the operational stations and as to the infeed back member support rail 46.

Structurally, the infeed conveyor assembly 194 is comprised of a centrally positioned conveyor assembly support member 202 through which the infeed conveyor drive shaft 204 driving the infeed conveyor belts double sheave drive pulley 206 is assembled at one end and through the other end thereof being assembled to the infeed conveyor idler shaft 208 which supports the infeed conveyor belts double sheave idler pulley 210, wherein said conveyor assembly support member 202 is assembled to said base support bar 198 by means of mounting block support posts 212 and pins 214. A set of flexible cleat carrying belts 216, each having a plurality of regularly spaced cleats 218, is installed about the double sheave drive and idler pulleys 206 and 210, wherein said cleats 218 on said belts 216 are offset with respect to lateral alignment of one plurality of cleats thereon to the other, as best illustrated in FIG. 11, and said cleats are shaped with infeed inclined angular configurations as best illustrated in FIG. 10, to better engage the upper interior surfaces of poultry back members positioned thereon for infeed transport to engagement by the impaling chain conveyor 22 and transfer to the infeed back member support rail 46. As also shown, the infeed conveyor assembly is further provided with guide tracks 220 for the flexible cleat carrying belts 216, which guide tracks are assembled to the member 202 by means of guide track support posts 222.

The infeed conveyor assembly is driven in rotary infeed motion by means of sprocket 224 through chain 226, powered off the main machine drive shaft, not shown. During infeed use application the operator removes poultry back members from the staging tray 18 and places the same in a tail-leading opened configuration so that the respective flank sections thereof drape downwardly over the conveyor assembly sides and the cleats 218 engage the upper interior surfaces of said poultry back members and transport the same forward to engagement by the impaling chain conveyor 22 and transfer to the infeed back member support rail 46. As previously described, the flank section side guide rails 86 serve to hold the respective depending flank sections of a poultry back member in position during conveyable transport through subsequent processing operation stations, and as also previously described, the main drive motor shut-off safety guard 70 serves to throw a main drive motor shut-off switch in the event of either a jam at the infeed station or operator deflection of said safety guard. It should be noted, however, by use of said double-belted infeed conveyor assembly in place of the water slide infeed trough, a need for the flank spreading angle bars as previously described is eliminated since the physical operator act of manual positioning placement of poultry back members upon the spaced double-belted assembly of the infeed conveyor provides the poultry back member depending flank section spreading which would otherwise have been accomplished by said flank spreading angle bars.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

We claim:

1. A machine for processing the back carcass members of poultry comprising a frame structure to support processing stations within said machine for removing the tails and skin from the backs of a progressive series of poultry back carcass members while making a single pass therethrough having progressively assembled thereto inward from the infeed end of said machine:

(a). a poultry back carcass member infeed staging tray, (b). a configured poultry back carcass member water slide infeed trough, (c). an operator infeed safety guard assembly, and (d). an improvement modification assembly for automatically processing the interior surfaces of poultry back carcass members sequentially conveyed therethrough, said improvement modification assembly — comprises — in combination a laterally disposed poultry back carcass member flank distending means followed by a longitudinally aligned and laterally disposed rotating screen poultry back carcass member interior fatty tissue removal means in turn followed by a longitudinally aligned and laterally disposed kidney retaining membrane severing — means and a — kidney removal means, and a longitudinally continuous poultry back carcass member support and transit means.

2. The machine according to claim 1 in which said poultry back carcass member infeed staging tray is located at an elevated position relative to the operator station and angularly inclined theretowards, thereby facilitating delivery of poultry back carcass members placed therein to the operator station for manual operator placement of said poultry back carcass members into said water slide infeed trough.

3. The machine according to claim 2 in which said infeed staging tray is provided with interconnected side panels extending vertically upward from the base thereof along all sides thereof.

4. The machine according to claim 3 in which said infeed staging tray is rectangular in shape.

5. The machine according to claim 1 in which said water slide infeed trough is angularly inclined towards and in longitudinal alignment with the infeed position to said improvement modification assembly.

6. The machine according to claim 5 in which said water slide infeed trough is provided with a longitudinally extending laterally disposed upwardly arched configured base.

7. The machine according to claim 5 in which said water slide infeed trough is provided with a means connecting the upward terminal end thereof to a water supply source.

8. The machine according to claim 5 in which said water slide infeed trough is provided with interconnected side panels extending vertically upward from said configured base thereof along all sides thereof.

9. The machine according to claim 8 in which said water slide infeed trough is rectangular in shape.

10. The machine according to claim 5 in which said water slide infeed trough is provided with a trough guard comprised of a spaced plurality of longitudinally interconnected inverted U-shaped members assembled upon said trough at the lower inclined end thereof.

11. The machine according to claim 1 in which said safety guard assembly is pivotally interconnected to said frame structure of said machine and further pivotally interconnected to a longitudinally extending connecting rod assembled at the other end thereof to the main drive motor shut-off switch such that in the event of an operational poultry back carcass member infeed jam to said improvement modification assembly said main drive motor of said machine is shut off.

12. The machine according to claim 11 in which said safety quard assembly is manually activated by the operator to shut off said main drive motor of said machine.

13. The machine according to claim 1 in which said laterally disposed poultry back carcass member flank distending means is comprised of a set of angularly positioned angularly depending elongated rod members.

14. The machine according to claim 13 in which said elongated rod members are rectangular in shape.

15. The machine according to claim 1 in which said rotating screen poultry back carcass member interior fatty tissue removal means is comprised of a set of endless loop counterrotating screens laterally spaced and angularly positioned relative one to the other.

16. The machine according to claim 15 in which said screens are laterally displaced at equal angles relative one to the other.

17. The machine according to claim 15 in which the tension on said screens is adjustable.

18. The machine according to claim 15 in which the angular positioning of said screens is equal with respect of one to the other.

19. The machine according to claim 15 in which said screens are respectively provided with a water spray nozzle lubricating and flushing means.

20. The machine according to claim 1 in which said kidney retaining membrane severing means is comprised of a set of triangularly shaped statically positioned blade members.

21. The machine according to claim 1 in which said kidney removal means is a vacuum system.

22. The machine according to claim 1 in which said poultry back carcass member support means is a longitudinally extending configured rail.

23. The machine to claim 1 in which said poultry back carcass member transport means is an impaling conveyor chain.

24. The machine according to claim 23 in which said impaling conveyor chain is adjustable to accommodate poultry back carcass members of different thickness.

25. A machine for processing the back carcass members of poultry comprising a frame structure to support processing stations within said machine for removing the tails and skin from the backs of a progressive series of poultry back carcass members while making a single pass therethrough having progressively assembled thereto inward from the infeed end of said machine:
 (a). a poultry back carcass member infeed staging tray,
 (b). a double-belted infeed conveyor assembly,
 (c). an operator infeed safety guard assembly, and
 (d). an improvement modification assembly for automatically processing the interior surfaces of poultry back carcass members sequentially conveyed therethrough, said improvement modification assembly — comprises — in combination a longitudinally aligned and laterally disposed rotating screen poultry back carcass member interior fatty tissue removal means in turn followed by a longitudinally aligned and laterally disposed kidney retaining membrane severing — means and a — kidney removal means, and a longitudinally continuous poultry back carcass member support and transport means.

26. The machine according to claim 25 in which said poultry back carcass member infeed staging tray is located at an elevated position relative to the operator station and angularly inclined thertowards, thereby facilitating delivery of poultry back carcass members placed therein to the operator station for manual operator placement of said poultry back carcass members onto said double-belted infeed conveyor assembly.

27. The machine according to claim 26 in which said infeed staging tray is provided with interconnected side panels extending vertically upward from the base thereof along all sides thereof.

28. The machine according to claim 27 in which said infeed staging tray is rectangular in shape.

29. The machine according to claim 25 in which said double-belted infeed conveyor assembly is comprised of a pair of longitudinally disposed and laterally spaced parallel belts respectively assembled at one end thereof to a laterally spaced sheave of a double sheave drive pulley and at the other end thereof to an equally laterally spaced sheave of a double sheave idler pulley.

30. The machine according to claim 29 in which said pair of longitudinally disposed and laterally spaced parallel belts are respectively provided with a plurality of cleats.

31. The machine according to claim 30 in which the number of cleats comprising the plurality thereof on one belt of said pair of belts is equal to the number of cleats comprising the plurality thereof on the other belt of said pair of belts.

32. The machine according to claim 31 in which the cleats comprising the plurality thereof on one belt of said pair of belts is longitudinally off set with respect to lateral alignment relationship to the cleats comprising the plurality thereof on the other belt of said pair of belts.

33. The machine according to claim 30 in which said cleats are shaped with infeed inclined angular configurations along the infeed oriented surface faces thereof.

34. The machine according to claim 25 in which said safety guard assembly is pivotally interconnected to said frame structure of said machine and further pivotally interconnected to a longitudinally extending connecting rod assembled at the other end thereof to the main drive motor shut-off switch such that in the event of an operational poultry back carcass member infeed jam to said improvement modification assembly said main drive motor of said machine is shut off.

35. The machine according to claim 34 in which said safety guard assembly is manually activated by the operator to shut off said main drive motor of said machine.

36. The machine according to claim 25 in which said rotating screen poultry back carcass member interior fatty tissue removal means is comprised of a set of endless loop counterrotating screens laterally spaced and angularly positioned relative one to the other.

37. The machine according to claim 36 in which said screens are laterally displaced at equal relative one to the other.

38. The machine according to claim 36 in which the tension on said screens is adjustable.

39. The machine according to claim 36 in which the angular positioning of said screens is equal with respect of one to the other.

40. The machine according to claim 36 in which said screens are respectively provided with a water spray nozzle lubricating and flushing means.

41. The machine according to claim 25 in which said kidney retaining membrane severing means is comprised of a set of triangularly shaped statically positioned blade members.

42. The machine according to claim 25 in which said kidney removal means is a vacuum system.

43. The machine according to claim 25 in which said poultry back carcass member support means is a longitudinally extending configured rail.

44. The machine according to claim 25 in which said poultry back carcass member transport means is an impaling conveyor chain.

45. The machine according to claim 44 in which said impaling conveyor chain is adjustable to accommodate poultry back carcass members of different thicknesses.

* * * * *